July 20, 1965 A. SMITH 3,195,826

MAGNETIC TAPE CASSETTES

Filed May 27, 1963 2 Sheets-Sheet 1

INVENTOR
Alec Smith
BY Kemon Palmer, Stewart & Estabrook
ATTORNEYS

July 20, 1965 A. SMITH 3,195,826

MAGNETIC TAPE CASSETTES

Filed May 27, 1963 2 Sheets-Sheet 2

INVENTOR
Alec Smith
BY Kimmon, Palmer, Stewart & Estabrook
ATTORNEYS

United States Patent Office 3,195,826
Patented July 20, 1965

3,195,826
MAGNETIC TAPE CASSETTES
Alec Smith, Banstead, Surrey, England, assignor to Clarke & Smith Manufacturing Company Limited, Wallington, Surrey, England, a British company
Filed May 27, 1963, Ser. No. 283,500
Claims priority, application Great Britain, June 5, 1962, 21,699/62
9 Claims. (Cl. 242—55.13)

Figure 1:
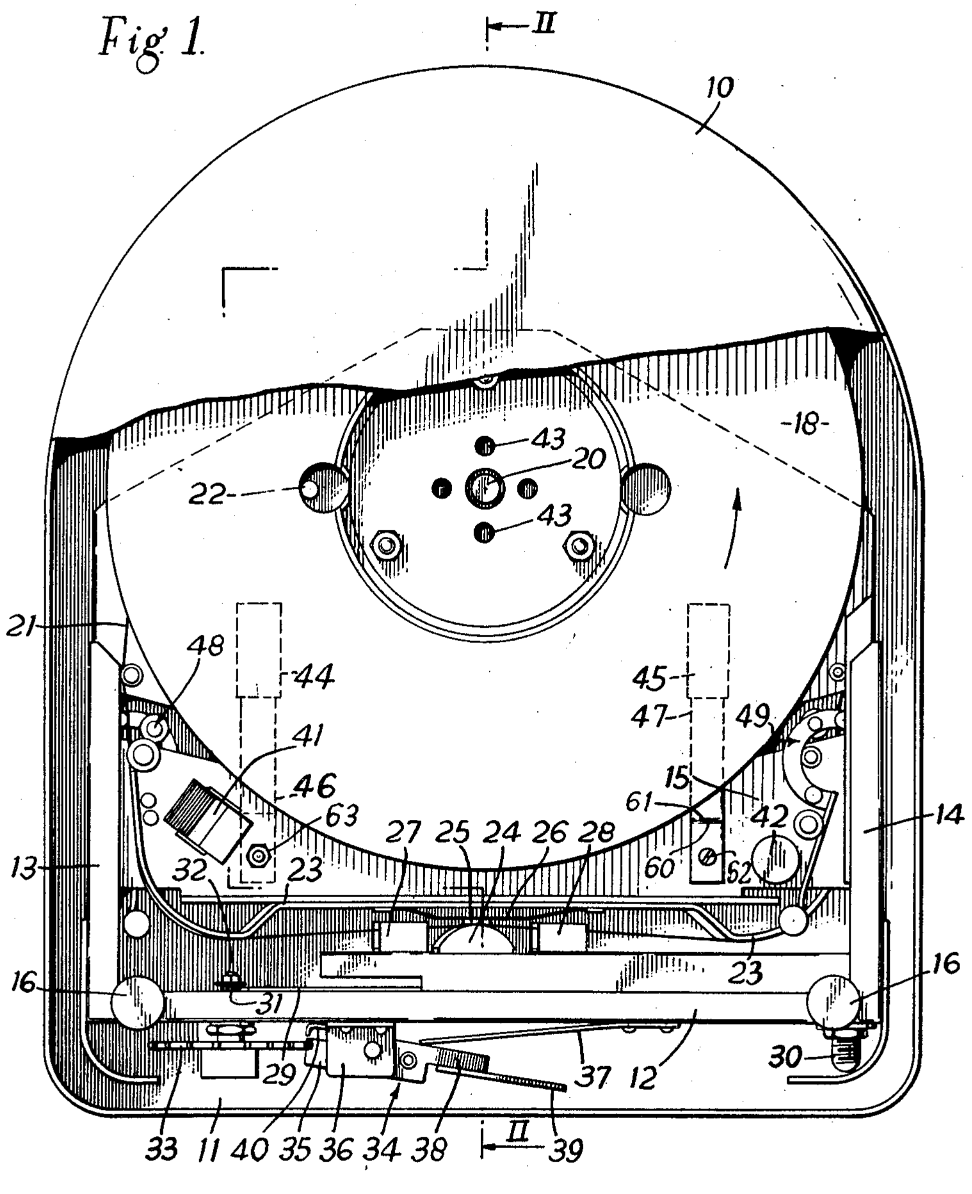

The present invention relates to magnetic tape cassettes and in particular to a cassette in which two rotatably-mounted spools and a tape extending between them are so arranged that one or other spool can be engaged with a driving element rotating in one direction only to draw the tape from the free spool onto the driven spool and control devices are arranged to subject each spool to a drag sufficient to prevent over-running of the free spool.

A cassette of this kind in which the spools are mounted face to face on a common axis and the tape runs off one spool on one side of the axis and onto the other spool on the other side of the axis, the cassette being inverted to reverse the direction of travel of the tape between the spools, and which includes a reproducing head movable across the width of the tape to reproduce a number of tracks which are recorded thereon, is in use as a "Talking Book" for blind people. A library of such cassettes is maintained from which the cassettes are sent out by post to the users.

Difficulty has been experienced in maintaining the tape taut between the spools during transmission through the post and throughout subsequent handling. Since both spools are free to rotate and subjected to only a relatively small drag by the control devices, which are friction pads engaging the faces of their respective spools, there is a tendency for tape spillage to occur, with the formation of loose loops of tape between the spools, when the cassette is subjected to vibration and rough handling. When such spillage occurs the cassette must be adjusted before it is used and the blind users are unlikely to be aware of the necessity for adjustment or to be capable of carrying it out.

It is an object of the present invention to overcome this disadvantage and provide a magnetic tape cassette which is simpler and more foolproof in operation and use and is thus more suited to the special needs of blind users.

In accordance with the present invention there is provided a magnetic tape cassette in which two rotatably-mounted spools and a tape extending between them are so arranged that one or other spool can be engaged with a driving element rotating in one direction only to draw the tape from the free spool onto the driven spool and control devices are arranged to subject each spool to a drag sufficient to prevent overrunning of the free spool, including a braking device associated with each spool to prevent tape spillage, each braking device comprising a pivoted arm balanced about its pivot and spring-biassed to press a brake element on the arm against the rim of the spool, the arm also having a guide element around which the tape passes in such a way that when the tape is under tension it holds the brake element out of engagement with the rim of the spool.

The tape may be arranged to pass over fixed guides on each side of the guide element on the arm, the guide element bearing on the opposite side of the tape to the fixed guides and tending to pull the tape into a loop between the fixed guides under the influence of the spring bias on the arm.

The brake and guide elements may be on the same side of the pivot of the arm and may consist, for example, of a guide pin mounted on one end of the arm and a rubber-covered post mounted on the arm close to the guide pin.

Figure 2:
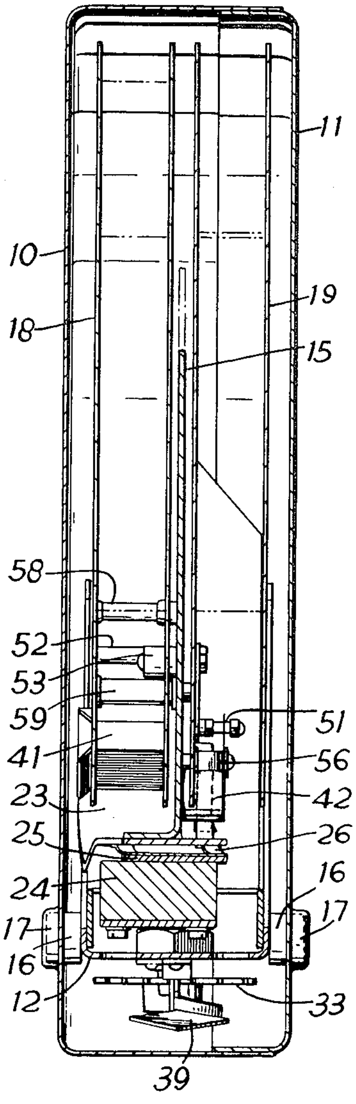
Figure 3:
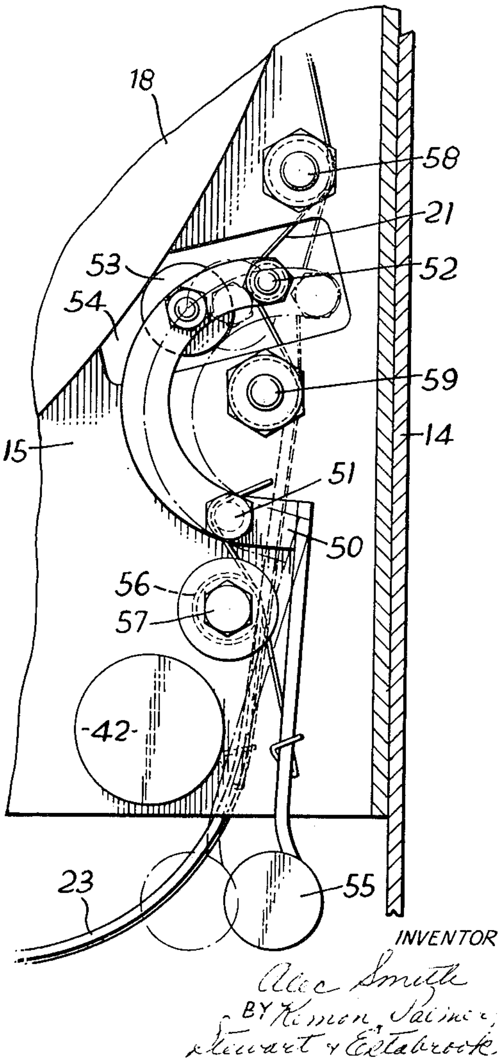

By way of example the application of the invention to a "Talking Book" cassette such as that described above will now be described with reference to the accompanying drawings, but it will be appreciated that the invention is equally applicable to other kinds of cassette. In the drawings:

FIG. 1 is a plan view of the cassette with the cover cut away to show the mechanism removably mounted inside the cover, FIG. 2 is a section on the line II—II of FIG. 1, and FIG. 3 is a detail of one of the braking devices of FIG. 1 on an enlarged scale.

The cassette shown in the drawings has a cover in the form of a box 10 with a lid 11 which is normally secured in place by screws (not shown). Within the cover is mounted a removable frame consisting of a base member 12, side members 13 and 14, and a centre plate 15 mounted between the side members 13 and 14. The frame carries the mechanism of the cassette and is located within the cover by hard rubber studs 16 fitting in recesses 17 (FIG. 2) in the box 10 and lid 11. Thus on removal of the lid 11 the frame can be lifted out of the box 10 to provide ready access to the mechanism.

The centre plate 15 of the frame carries two spools 18 and 19 which are mounted on central pivots so as to be freely rotatable in either direction about a common axis of rotation 20. A tape 21 is secured at one end to the spool 18 by passing it through a slot in the bobbin of the spool and securing it to a cylindrical end stop 22 too large in diameter to pass through the slot. The tape 21 is wound on the spool 18 anti-clockwise as seen in FIG. 1 and leaves the spool 18 to the left of the axis of rotation 20. A guide plate 23 secured to the centre plate 15 of the frame at the edge of the centre plate adjacent the base member 12 guides the tape 21 to the other side of the centre plate 15 and on to the right hand side of the spool 19, on which the tape is wound clockwise as seen in FIG. 1.

In its passage between the two spools 18 and 19 through the space between the centre plate 15 and the base member 12 the tape passes over a magnetic reproducing head 24, against which it is pressed by a pressure pad 25 carried by a spring element 26. The tape is guided by edge guides 27 and 28 mounted on either side of the head 24.

The magnetic head 24 is mounted on a lever arm 29 pivoted at one end on a pivot pin 30. The other end of the lever arm 29 is curved and formed with rack teeth engaging a pinion 31 which is carried by a spindle 32 to the other end of which is attached a toothed wheel 33. The spindle 32 is mounted in a bearing in the base membr 12 and biassed for rotation in one direction. Rotation of the spindle 32 and hence movement of the magnetic head 24 across the width of the tape 21 is controlled by a stepping lever 34 one arm 35 of which engages the teeth of the wheel 33. The lever 34 is pivotally mounted on a bracket 36 and biassed by a leaf spring 37 towards the position shown in the drawings, in which it locks the toothed wheel 33 against rotation. The arm 38 of the lever 34 remote from the wheel 33 carries a finger plate 39 which can be depressed to disengage the other arm 35 of the lever 34 from the wheel 33. The arm 35 carries a resilient prong 40 which extends into the path of the next tooth when the finger plate 39 is depressed and releases this next tooth to engage the end of the arm 35 as the plate 39 is released. Thus the toothed wheel 33 advances by the separation between two teeth each time the finger plate 39 is depressed and released. After the completion of one revolution of the wheel 33 under the influence of its bias a stop tooth comes into engagement with the end of the arm 35 of the lever 34. This stop tooth is bent up out of the plane of the wheel 33 so that the arm 35 cannot be disengaged from it by depression of the finger plate 39. The wheel 33 can be re-set by rotating it against the bias with the finger plate 39 depressed, the teeth being forced past the resilient prong 40.

To facilitate re-setting of the magnetic head 24 the wheel 33 and the associated stepping lever 34 may be modified. The teeth of the wheel may be replaced by a ring of perforations in its disc and the arm 35 may be provided with two overlapping prongs, one of which is resilient, which project into the perforations from opposite sides of the wheel. The periphery of the wheel, which is then continuous, can be milled and is made accessible from the exterior of the cover to enable re-setting to any desired track on the tape to be effected by the user.

The magnetic head 24 is connected to the reproducing apparatus on the deck by one of two connectors 41 mounted on the centre plate 15 by means of insulating blocks 42.

The spools 18 and 19 each have four apertures 43 at the centre which are engageable with registering pins on a driving element mounted on the deck and rotated at constant speed by a driving motor. When the cassette is placed on the deck with the spool 18 lowermost that spool is driven by the driving element to draw the tape 21 from the spool 19 onto the spool 18. On inversion of the cassette the spool 19 is engaged by the driving element to draw the tape onto the spool 19 from the spool 18.

To prevent over-running of the trailing spool from which the tape is being drawn, which would result in the formation of a loose loop of tape between the spools, the spools 19 and 18 are subjected to a frictional drag by controlling devices consisting of friction pads 44 and 45 carried by spring arms 46 and 47, respectively, attached to the centre plate 15.

The spring arms 46 and 47 are each mounted in the same manner as the other and the same reference numerals will be used in describing their mounting. Each spring arm has an opening which fits over a peg 60 attached to the plate 15 and is bent along the line 61 so as to be capable of rocking about this line of contact with the plate. The pressure of the pad can thus be changed by altering the pressure on the end of the arm remote from the pad. This is controlled by a screw whose head 62 bears on this end of the arm. The screw is mounted in a threaded sleeve passing through the plate 15 and has a double nut 63 on its other end to enable it to be adjusted from either side of the plate.

While one spool is being driven the tape is thus held taut between the two spools, the friction pad 44 or 45 creating just sufficient drag to ensure this while the tape is being pulled off the spool 18 or 19 respectively. When the cassette is removed from the deck the two spools are free to rotate independently subject only to the drag of the friction pads, which is insufficient to hold the spools stationary when the cassette is subjected to vibration and rough handling and cannot prevent relative displacement of the two spools resulting in tape spillage and the formation of a loose loop of tape between the spools.

To prevent this tape spillage the cassette is provided with braking devices 48 and 49 (FIG. 1) assoicated with the spools 18 and 19 respectively. These braking devices are identical in construction and corresponding parts of the two devices have been given the same reference numerals in FIGS. 2 and 3. FIG. 3 shows the details of the braking device 49. In FIG. 2 the tape 21 has been omitted to allow the braking device 48 to be seen. The braking device 49 consists of an arm 50 mounted on a pivot 57 fixed to the centre plate 15. The arm 50 is of arcuate form on one side of the pivot 51 and carries at its end a guide pin 52 and close to the end a rubber-covered braking post 53. The pin 52 and post 53 project through an opening 54 in the plate 15. On the other side of the pivot 51 the arm 50 is straight and carries at its end a weight 55 which balances the weight of the parts on the other end of the arm so that the arm 50 has no tendency to turn about the pivot 51 whatever the orientation of the cassete. The arm 50 is biassed for movement about the pivot 51 in an anti-clockwise direction, as seen in FIG. 3, to bring the braking post 53 into engagement with the rim of the spool 19, by means of a coil spring 56. The spring 56 is mounted on a pin 57 and its ends bear against the straight part of the arm 50 and against the pivot 51.

Fixed to the centre plate 15 on either side of the opening 54, and projecting from the face of the plate 15 on which the spool 19 is mounted, are two fixed guides 58 and 59. The tape 21 running from the spool 19 is arranged as shown, passing in a loop round the guide pin 52 in its passage between the fixed guides 58 and 59. The guide pin 52 bears against the opposite side of the tape to the fixed guides 58 and 59 and the spring 56 holds the tape 21 in the sinuous path between the guides 58, 52, and 59. The braking posts 53 engaging the rims of the spools apply sufficient braking force to prevent rotation of the spools in such a sense as to cause tape spillage. When one of the spools is driven, however, the tape is pulled taut and moves the guide pin 52 into line with the fixed guides 58 and 59, turning the arm 50 about the pivot 51 against the bias of the spring 56 to the position shown in broken lines and thus disengaging the braking post 53 from the rim of the spool and allowing the spool to be rotated.

I claim:

1. A tape cassette comprising two rotatably-mounted spools, a tape extending between the said spools, the said spools being so disposed within the cassette that either one of said spools is engageable by an external driving element rotating in one direction only to draw the tape from the other spool onto the driven spool, control devices subjecting each spool to a drag sufficient to prevent over-running of the spool when tape is drawn from it, and a braking device associated with each spool to prevent tape spillage, each braking device comprising a pivoted arm balanced about its pivot, a brake element on the said arm engageable with the rim of the spool, spring means biassing the arm towards engagement of the brake element with the rim, and a guide element on said arm cooperating with the tape whereby the brake element is held out of engagement with the rim of the spool when the tape is under tension.

2. A cassete as claimed in claim 1 including fixed guides on each side of the guide element on the arm, the guide element bearing on the opposite side of the tape to the fixed guides and tending to pull the tape into a loop between the fixed guides under the influence of the spring bias on the arm.

3. A cassette as claimed in claim 1 in which the brake and guide elements are on the same side of the pivot of the arm.

4. A cassette as claimed in claim 1 in which the brake element is a rubber-covered post.

5. In a tape cassette, a braking device for a spool, actuated by the tape and comprising a pivoted arm balanced about its pivot, a brake element carried on said arm, spring means biassing the arm for engagement of the brake element with the spool, and a guide element mounted on said arm, the tape cooperating with said guide element to move the arm against the bias and thereby draw the brake element out of engagement with the spool when the tape is under tension.

6. In a tape cassette, a braking device as set forth in claim 5 in which the guide element is a post mounted at one end of the arm, and the brake element is a post mounted adjacent said guide post and covered with resilient material, including guides fixed in the cassette on either side of the guide post on the arm, the tape running over the sides of the fixed guides remote from the guide post and the side of the guide post remote from the fixed guides and the arm being biassed to draw the guide post away from the fixed guides and thereby form a loop in the tape.

7. A cassette as claimed in claim 1 in which said control devices comprise a friction pad cooperating with each spool, and two spring arms carrying the said friction pads.

8. A cassette as claimed in claim 2 in which said control devices comprise two pivotally mounted spring arms, friction pads mounted on said arms for cooperation with the spools, and screw means for adjusting the positions of said arms about their pivots to vary the pressure on said friction pads.

9. In a tape cassette as claimed in claim 6, friction pads bearing against each spool to prevent over-running of the spool when tape is being drawn from it and spring means for applying a controlled pressure to said friction pads.

References Cited by the Examiner

UNITED STATES PATENTS

| | | | |
|---|---|---|---|
| 2,893,737 | 7/59 | Travis. | |
| 3,078,464 | 2/63 | Lyons et al. | 242—55.13 |

MERVIN STEIN, *Primary Examiner.*